Figure 5:
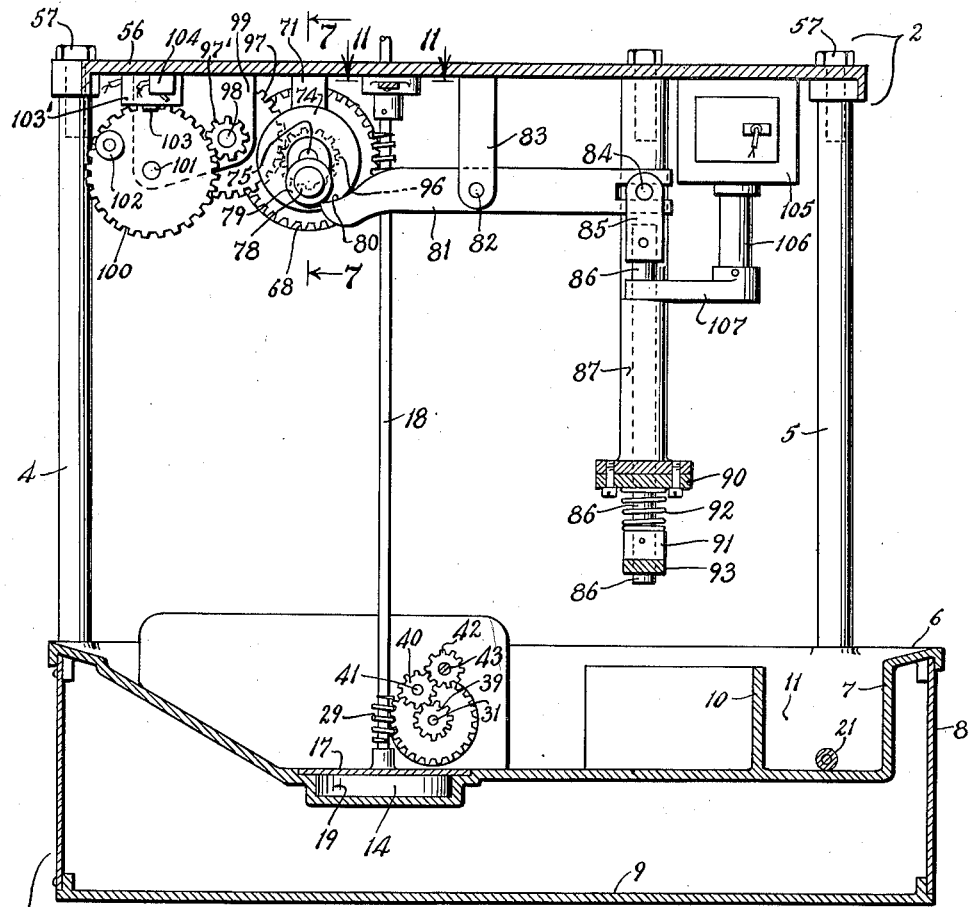

March 25, 1952     F. W. CORBETT     2,590,157
DOUGHNUT MACHINE
Filed April 26, 1948     3 Sheets-Sheet 1
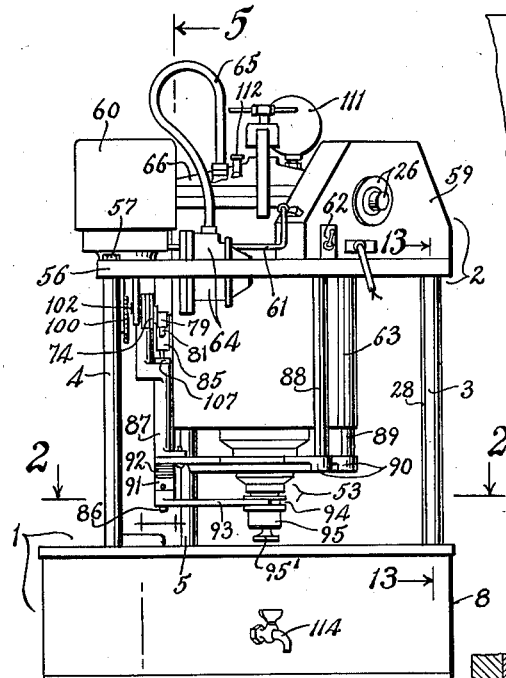
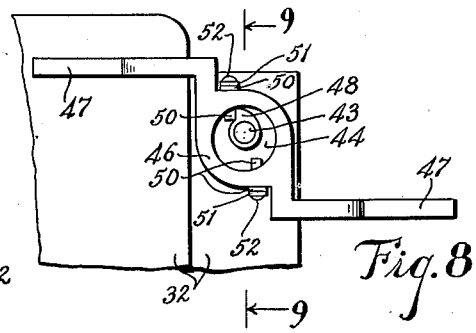
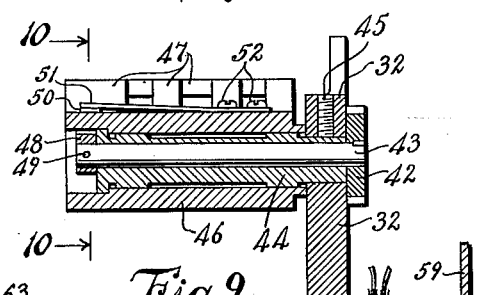
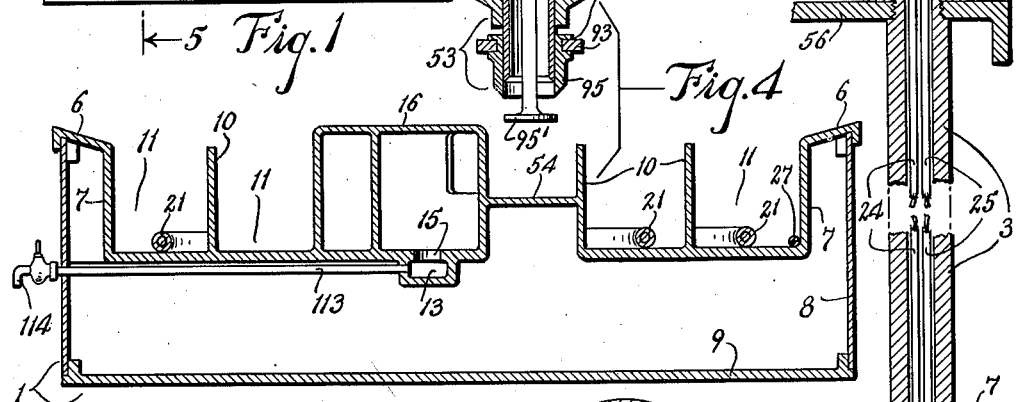
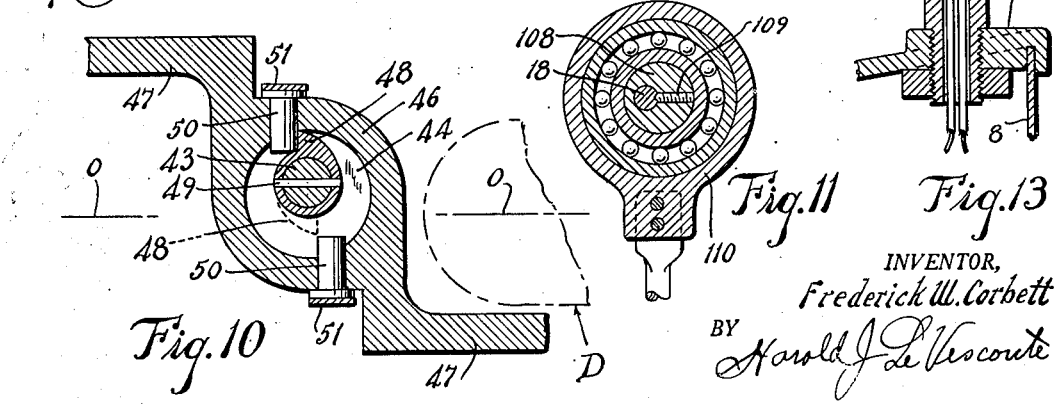
INVENTOR,
Frederick W. Corbett
BY
Harold J. LeVicomte
ATTORNEY.

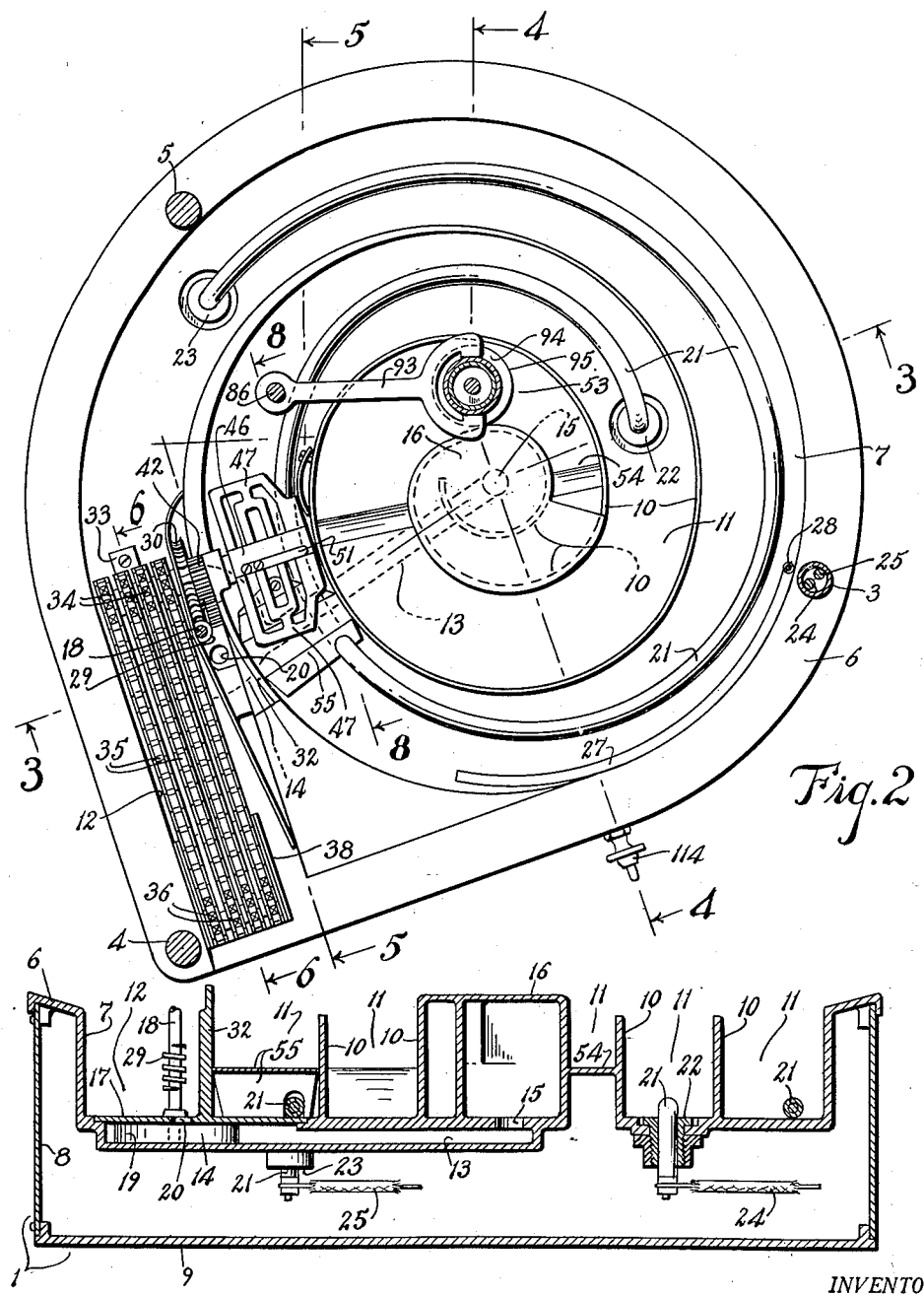

March 25, 1952 — F. W. CORBETT — 2,590,157
DOUGHNUT MACHINE
Filed April 26, 1948 — 3 Sheets-Sheet 3

INVENTOR,
Frederick W. Corbett
BY Harold J. LeVescoute
ATTORNEY

Patented Mar. 25, 1952

2,590,157

UNITED STATES PATENT OFFICE 2,590,157

DOUGHNUT MACHINE

Frederick W. Corbett, Burbank, Calif.

Application April 26, 1948, Serial No. 23,192

11 Claims. (Cl. 99—406)

This invention relates to doughnut making and frying machines and more particularly to an improved form thereof for continuously producing doughnuts with a minimum of attention from the operator.

A common type of doughnut machine is one adapted to be placed and operated in retail stores so that the freshly cooked product may be sold direct to the consumer. Such machines generally comprise a container from which blanks of dough are dropped one by one into a cooking vessel and in which some means is employed to cause the blanks to travel in a fixed path in the cooking oil to a discharge point and in which at a midpoint in that path, some means is employed to turn the doughnuts for cooking on the other side. The path-determining means usually is one of two general types. One type is that which employs a sort of vertical axis paddle wheel dividing the cooking oil into a series of pockets and the blanks are dropped into these pockets and are caused to progress by the rotation of the wheel. The more common type employs a cooking vessel so formed as to have a spiral channel and the blanks are caused to progress along the channel by the circulation of the oil; which circulation may be effected either by a suitable pump or by the convection resulting from the manner in which heat is applied to the cooking oil. All of these machines, so far as I am aware, must be continuously operated at the production rate for which they are designed or completely stopped, the die means for dropping the blanks removed or else the heat from the oil will partially cook the dough within the die; necessitating a laborious cleaning operation. Even when the machine is stopped, some time is required to put it into operation due to the fact that the oil must again be brought up to cooking temperature and this loss of time is objectionable in those situations where the demand fluctuates greatly.

Also, in the spiral path type of cooking vessel in which the flow of the oil is the means for moving the doughnuts along the channel, a limiting factor has been the time required for the flow of the oil to move the blanks out of the path of the next blank to be dropped. At the time the blank is dropped, it has no forward movement and is relatively heavy. Eventually, its speed will be that of the flow of the oil but the delay in starting to move and attain maximum speed will result in a wider spacing of the doughnuts along the channel than is necessary and a reduction in the rate at which they could otherwise be dropped.

With the foregoing and other considerations in mind, it is an object of the invention to provide a doughnut machine in which the blank forming means can be operated selectively at different speeds to accommodate variations in demand without the necessity either of running the machine at full capacity or shutting it down completely.

Another object of the invention is to provide a doughnut machine in which the rate of flow of the cooking oil is momentarily increased at the point at which the blanks of dough are dropped into it so that the blanks will be more quickly moved out of the path of the succeeding blanks to be dropped with an attendant increase in the rate of production.

Still another object of the invention is to provide a doughnut machine having a spiral cooking channel with a turning means interposed therein and in which the rate of flow of the cooking oil is momentarily increased at the discharge side of the turning means so that each doughnut is more quickly moved out of the path of the next doughnut to be turned.

A still further object of the invention is to provide a doughnut machine in which the cooking oil is circulated by a pump means and in which the pump housing is formed in part by the cooking vessel.

A still further object of the invention is to provide a doughnut machine in which the dough is forced out of the container therefor by air pressure.

Still another object of the invention is to provide a doughnut machine having a turning mechanism so constructed and arranged as to reduce the danger of clogging and jamming thereof.

A still further object of the invention is to provide a doughnut machine having the above desirable characteristics and which is simple in construction and susceptible of economical manufacture, which is easy to maintain and is reliable in operation.

Figure 6:
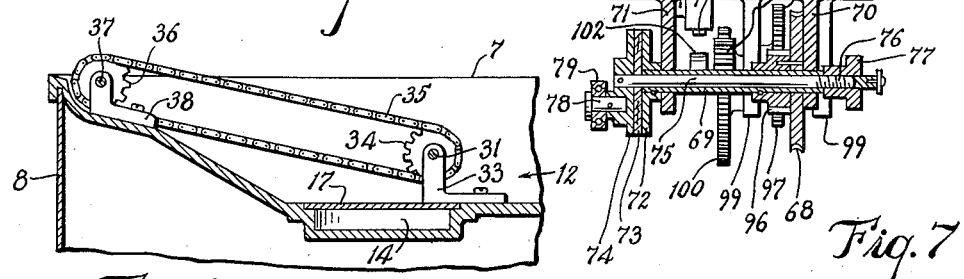
Figure 7:
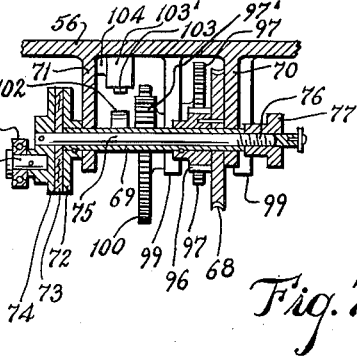
Figure 12:
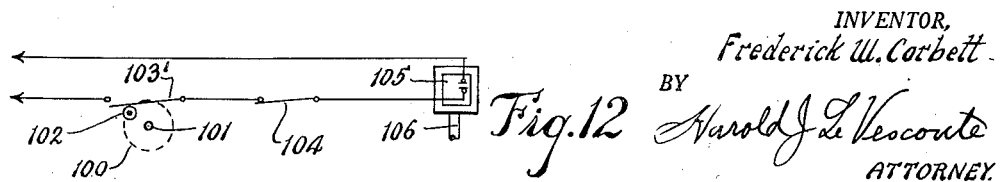

With the above objects in view, together with such other objects and advantages as may subsequently appear, the invention resides in the parts and in the construction, combination, and arrangement of the parts, or their equivalents, hereinafter described in the following specifications of an illustrative mode of execution of the invention; reference being had to the accompanying drawings, in which:

Fig. 1 is a front elevation of a doughnut machine embodying the invention,

Fig. 2 is an enlarged, sectional, top plan view taken on the line 2—2 of Fig. 1 and showing the cooking vessel, Fig. 3 is a transverse sectional elevation of the cooking vessel and base of the machine, the section being taken on the line 3—3 of Fig. 2, Fig. 4 is a sectional elevation of the cooking vessel and base of the machine taken on the line 4—4 of Fig. 2, Fig. 5 is a vertical sectional elevation of the machine taken on the lines 5—5 of Figs. 1 and 2, Fig. 6 is a fragmentary sectional view taken on the line 6—6 of Fig. 2 and particularly showing the means for elevating and discharging cooked doughnuts, Fig. 7 is a fragmentary sectional view taken on the line 7—7 of Fig. 5 and showing details of construction of the driving means for the blank dropping devices, Fig. 8 is an enlarged, fragmentary view taken on the line 8—8 of Fig. 2 showing the turning means in end elevation, Fig. 9 is a medial sectional view taken on the line 9—9 of Fig. 8, Fig. 10 is an enlarged, sectional view of the clutch for the turning means taken on the line 10—10 of Fig. 9, Fig. 11 is an enlarged fragmentary view of the air pump drive means taken on the line 11—11 of Fig. 5, Fig. 12 is a circuit diagram of the control for the low speed blank dropping means, and Fig. 13 is a fragmentary, sectional view of one of the supporting rods or posts which serve also as a conduit for the wires leading to the heating means for the cooking vessel; the section being taken on the line 13—13 of Fig. 1.

The illustrated embodiment of the invention comprises a base assembly 1 and an upper assembly 2 supported on and secured to the upper ends of spacing rods 3, 4 and 5, which rods are secured to the upper edge of the cooking vessel 7 which, in turn, is mounted on the upper edge of the enclosing wall member 8 secured to and rising from a bottom member 9. As best shown in Figs. 2 to 5, inclusive, the cooking vessel 7 comprises a pan having a spiral wall 10 extending outwardly from the center thereof to form a spiral channel 11 terminating in a tangentially extending portion 12 at the periphery of the vessel. Extending along the under side of the vessel is a radially disposed channel 13 which at one end communicates with a cavity for a pump impeller and at its other end communicates through an opening 15 in the bottom of the vessel with the inner or beginning end of the spiral channel 11. Preferably, the beginning end of the channel is covered by an integrally formed top portion 16 to prevent cooking oil from being thrown out of the vessel.

The upper face of the impeller cavity is closed by a plate 17 having a bearing in which the lower end of a vertically disposed shaft 18 is journaled. The shaft extends into the cavity 14 and carries a multi-vaned impeller 19. Above the impeller, the plate 17 is provided with an inlet opening 20. As the shaft 18 is rotated by means hereinafter described, the impeller will draw the cooking oil in through the opening 20 and discharge it into the channel 13 and thus cause a constant circulation of the oil along the channel 11. While the pump induced circulation terminates at the juncture of the channels 11 and 12, the primary need for the circulation is to cause doughnuts being cooked therein to be moved along the channel 11. After reaching the channel 12, the dough-nuts are moved by a discharging means hereinafter to be more particularly described and this means is sufficient to impart circulation to the oil in that portion of the channel.

A resistance heating element 21 extends along the major portion of the channel 11 and the ends thereof extend through the seals 22 and 23 to the underside of the vessel where they are connected by wires 24 and 25 which extend up through the post 3 to a source of electric energy with an interposed manually variable heat control means including a hand knob and dial 26 and a thermostatic bulb 27 disposed in the bottom of the channel at about the mid point thereof, best shown in Fig. 2, and connected to the control means by a hollow wire 28 extending up to the control means along the exterior of the post 3. Such heating means and the controls therefor are well known and further description is not thought necessary.

Immediately above its bearing in the plate 17, the shaft 18 worm gear 29 which meshes with a worm wheel 30 fixed to a shaft 31 journalled in a bearing in the upstanding wall portion of the plate 17, which also serves as a continuation of the spiral wall 10 and the shaft is also journalled in a bearing bracket 33 rising from the face of the plate at about the mid width of the tangent channel 12. The shaft 31 extends across the channel 12 near the bottom thereof and carries a series of spaced sprockets 34 which are connected by a series of endless chains 35 to a second series of sprockets 36 fixed to an idler shaft 37 journalled in a bearing bracket 38 at the upper, outer end of the channel 12 with the top of the sprockets 36 above the top of the vessel (see Fig. 6). In general, the use of inclined conveyors of this character to remove cooked doughnuts from the cooking oil is well known in the art.

Between the worm wheel 30 and the bearing in the wall 32 the shaft 31 carries a gear 39 which meshes with an idler gear 40 mounted on a stub shaft 41 also carried by the wall 32 and the idler gear, in turn, meshes with a gear 42 fixed to a shaft 43 journalled in a sleeve 44 fixed in the wall 32 by a set screw 45 and which sleeve extends across the upper portion of the channel 11 on the opposite side of the wall from the tangent channel 12. The exterior of the sleeve 44 is eccentrically disposed with relation to the bearing for the shaft 44 and serves as a bearing for a turner 46 mounted for rotation thereon. The turner is provided with a pair of slotted, oppositely disposed and tangentially arranged blades 47, 47 which, upon rotation of the turner, will engage and lift doughnuts out of the cooking oil and drop them back in the oil turned over for cooking on the other side. To maintain cooking efficiency, it is essential that this turning action be accomplished in the least possible time and to that end, the turner is operated by the shaft 43 through a simple and novel intermittent clutch mechanism that will now be described.

As shown in Fig. 9, the shaft 43 and the hub of the turner 46 each extend beyond the free end of the sleeve 44. The end of the shaft carries a single toothed clutch dog 48 fixed thereto by a cross pin 49 and the turner hub carries a pair of oppositely disposed pins 50, 50 extending from the exterior of the hub into the path of the dog 48. On the exterior of the hub of the turner, the heads of the pins are engaged by the free ends of the leaf springs 51, 51 secured to the hub by screws 52, 52. Referring now to Fig. 10, the turner is shown in the position assumed at the start of the turning operation. One of the blades is substantially parallel to and below the level of the cooking oil, indicated by the dash line O, and a doughnut D has been moved by the flow of the oil into a position above the submerged blade 47. The shaft 43 is constantly rotating and at the time shown, it has moved the dog 48 into engagement with one of the pins 50. As the shaft continues to revolve in a clockwise direction, the turner will be caused to revolve with it and to lift the doughnut out of the oil and to drop it in inverted position in the oil on the other side of the turner. At this time, it is necessary that the further rotation of the turner be momentarily halted so that the flow of the cooking oil will carry the turned doughnut out of the path of the turner blade on the next turning operation. The eccentricity of the sleeve 44 is of such extent that as the shaft and dog reach the position shown in dotted lines in Fig. 10, the end of the pin will be moved beyond the end of the dog 48 and the turner will remain stationary while the shaft continues to revolve so that the dog 48 engages the other pin 50 for the next turning action. The curved rear face of the clutch dog permits the turner to be manually rotated if necessary in the event that the mechanism becomes jammed, in which case the pins 50 will ride up over the curved face on the clutch dog.

As the blanks are dropped from the die mechanism 53 into the current of cooking oil at the inner end of the spiral channel 11, they are moved by the flow of the oil out of the path of the next blank to be dropped. However, since they have no forward movement of their own at the time they are dropped, it requires some time for them to acquire the rate of movement of the oil. This results in their being more widely spaced along the channel than is necessary and in a reduction of the rate at which the blanks can be dropped. To overcome this deficiency, the bottom 54 of the channel 11, at the point at which the blanks are dropped and for a short distance beyond said point, is at a higher level than elsewhere along the channel effecting a reduction in the cross sectional area of the channel and resulting in a more rapid rate of flow in that portion of the channel with consequent more rapid removal of the blanks out of the path of the next blanks to be dropped from the die mechanism. As a result, the rate at which the blanks can be dropped will be more rapid than would be possible if the rate of flow of the cooking oil were uniform throughout the length of the channel.

Also the action of turning the doughnut acts to check its rate of travel until the flow of the oil will bring it up to its former rate of travel. To overcome this loss of speed, a baffle 55 rising from the bottom of the channel 11 at the discharge side of the turning mechanism acts to restrict the channel momentarily and to increase the rate of flow of the cooking oil at that point so that the turned doughnuts are quickly moved out of the path of the succeeding doughnuts delivered by the turner. Thus it will be seen that the above described restrictions of the channel 11 make possible an increased rate of production for a given length of channel and a reduction of the quantity of cooking oil required therefore with incident economy in the size of the machine and in the energy required to keep the oil at the desired cooking temperature.

The top assembly 2 is mounted on the base plate 56 secured on the upper ends of the solid rods 4 and 5 by screws 57, 57 and on the hollow rod 3 by a nut 58. This base plate supports a temperature control unit 59, including the hand knob and dial 26, a vertical axis motor 60 connected to the control unit 59 by a flexible cable 61 and controlled by a switch 62 located on the face of the control unit, a dough container 63 having the usual funnel-shaped lower end which engages a corresponding socket in the upper face of the die mechanism, and an air pump 64 adapted to be operated by the motor 60 and having its output side connected by the flexible tube 65 to the cover 66 of the dough container. The die mechanism is of the usual construction except for the operating means therefor, which will now be described.

The motor 60 is directly connected to the upper end of the shaft 18 and adjacent to the under side of the base plate 56, the shaft has fixed thereto a worm 67 which meshes with a worm wheel 68 fixed to a hollow shaft 69 journaled in bearings in the spaced arms 70 and 71 depending from the under side of the plate 56. Fixed to the shaft 69 at the outer face of the arm 71 is a clutch disc 72 and opposed to the face of this disc, with an interposed, freely rotatable washer 73 formed of clutch material, is a second clutch disc 74 carried by a rod 75 extending through the hollow shaft 69 and terminating in a threaded portion 76 beyond the end of the shaft. A thumb nut 77 on this threaded portion and adapted to engage the end of the hollow shaft provides a manually operable means whereby the discs 72 and 74 can be brought into clutching engagement or released therefrom.

The disc 74 on its outer face carries a crank pin 78 on which is mounted a ball bearing roller 79 adapted to momentarily engage the cam surface 80 on the end of a lever 81 fulcrumed on a pin 82 carried by a spaced pair of arms 83 depending from the plate 56 to the rear of the arms 70 and 71. The other end of the lever is forked and engages a cross pin 84 carried by a yoke 85 fixed to the upper end of the rod 86 slidingly mounted in a guide member 87 depending from the plate 56. The guide member 87 together with the rods 88 and 89 support a spider 90 which holds the die mechanism 53 in position and the rod 86 extends below the lower end of the member 87 and the portion of the spider connected thereto and carries a set collar 91 and a compression spring 92 which spring reacts between the collar and the lower face of the spider to constantly urge the rod 86 downwardly. At its lower end the rod 86 carries a laterally extending yoke member 93 of the arms at the free end of which engages a groove 94 on the exterior of the movable part 95 of the die mechanism.

As the roller 79 is moved in a circular path by rotation of the disc 74, it will momentarily engage the end of the lever 81 and move it in a clockwise direction, as viewed in Fig. 5, and cause it to lift the rod 86 and the die element 95, permitting the pressure in the dough container to force a quantity of dough out of the die. As the roller moves away from the lever the spring 92 will move the rod and the die element down cutting off the dough which will flow over the center member 95 of the die and drop into the cooking oil as a doughnut blank.

Heretofore, in doughnut machines in which the blanks are dropped into the cooking oil from a die mechanism located in close proximity of the oil, it has been necessary to keep the machine in full operation or else to cut off the heat and to remove the die means from the machine immediately on stopping the machine to prevent the heat from the oil from partially cooking the dough within the die with resultant clogging of the die. Machines of the types used in retail outlets are subject to fluctuating demands through the day and if the heat must be turned on and off and the die removed a considerable amount of time is consumed in attending to so doing and in waiting for the oil to heat up again when production is to be resumed.

It has been found that if the rate of production is greatly reduced, the movement of the dough through the die is sufficient to prevent the aforesaid partial cooking. It is not enough to merely reduce the speed of the driving means for operating the die, since the result would be that the die would be open for longer periods of time and the blanks would be larger. Thus to successfully reduce the rate of production, means must be provided which will open and close the die in the same elapsed time as at the higher rates of production.

The present invention embodies such an arrangement comprising a gear 96 fixed to and rotating with the worm wheel 68 and meshing with the large gear 97 of a step gear assembly including a shaft 98 journaled in a pair of arms 99, 99 depending from the plate 56 in front of the arms 70 and 71. The small gear 97' of this assembly meshes with a large gear 100 mounted on a second shaft 101 also carried by the brackets 99, 99, which gear on one face thereof carries an eccentrically disposed roller 102 which is adapted to engage the yielding detent 103 of a switch 103' carried by the base plate 56. Current is led from the control unit 59 through a manual switch 104 and the switch 103' to a solenoid coil 105 disposed on a vertical axis beneath the plate 56. The armature 106 of this coil is connected by a laterally extending arm 107 to the rod 86. Thus, assuming that the switch 104 is closed, at each revolution of the gear 100, the roller 102 will momentarily close the switch 103' and the solenoid 105 will be energized and will lift the armature 106 and the rod 86 with consequent opening of the die 53 only long enough to permit the formation of a blank of the same size as is formed by the operation of the lever 81 by the roller 79. It will be understood that when the above described low speed means is in use, the clutch mechanism will be released so that there will be no interference between the two die operating means. From the foregoing it will be realized, also, that other arrangements may be substituted for the simple reduction gearing shown by means of which several speeds of production may be made selectively available. Generally, the two speeds shown are sufficient, since if production tends to exceed the demand, the idling rate can be assumed until full production is again justified, at which time the machine can be set for full production without delay.

Above the worm 67, the shaft carries an eccentric 108 fixed thereto by a setscrew 109 and the eccentric is surrounded by one end of an eccentric strap 110, the other end of which is connected to the diaphragm of the air pump 64 which supplies the pressure to force the dough out of the die means 53. Additionally, the container cover is provided with a pressure gauge 111 and a relief valve 112 so that the pressure can be ascertained and so that the pressure can be relieved when necessary. To drain the cooking oil from the vessel a drain means is provided consisting of a tube 113 connecting with the channel 13 below the opening 15 and extending through the front wall of the member 8 where it is provided with a pet cock 114.

Thus there has been provided a doughnut making machine which is novel in construction and which, because of the novel mode of increasing the rate of flow of the cooking oil at certain critical points in the path of travel, is capable of high rates of production for a given length of cooking channel, and which further, is capable of limited rates of production to keep it ready for instant return to full production. Additionally, the driving motor runs at a constant rate regardless of the rate of production with a constant over all rate of flow for the cooking oil so that in any rate of production, the cooking time will be the same.

While I have described and illustrated one mode of execution of my invention, I do not limit myself to the exact form disclosed, and the invention includes such modifications of the parts and their equivalents, and of the construction, combination and arrangement thereof as come within the purview of the appended claims.

I claim:

1. In a doughnut machine, the combination of a spiral channel cooking vessel adapted to contain a quantity of cooking oil, means for heating said oil, means for dropping blanks of dough into said oil, a pump and a return conduit connected thereto adapted to maintain a circulation of oil along said channel at a constant volumetric rate with resultant propulsion of said blanks along said channel; said channel in the region of the dropping of said blanks being of less cross-sectional area than at other points along said channel with resultant momentary increase in the linear rate of flow of said oil in said region with the resultant capacity of an increased rate at which blanks may be dropped in said oil.

2. In a doughnut machine, the combination of a spiral channel cooking vessel adapted to contain a quantity of cooking oil, means for heating said oil, means for dropping blanks of dough into said oil, a pump and a return conduit connected thereto adapted to maintain a circulation of oil along said channel at a constant volumetric rate with resultant propulsion of said blanks along said channel; said channel being of uniform width through its length and of less depth at the point at which said blanks are dropped than at other points along its length with resultant increase in the linear rate of flow of the cooking oil at said point and increase in the linear speed with which a dropped blank is moved by said oil out of the vertical path of the next blank to be dropped by said dropping means.

3. In a doughnut machine, the combination of a spiral channel cooking vessel adapted to contain a quantity of cooking oil, means for heating said oil, mean for dropping blanks of dough into said oil, a pump and a return conduit connected thereto adapted to maintain a circulation of oil along said channel at a constant volumetric rate with resultant propulsion of said blanks along said channel, blank inverting means disposed in said channel; said channel being so constructed and arranged that the linear rate of flow of the cooking oil therein is momentarily increased at the points at which blanks are dropped and are inverted.

4. In a doughnut machine, the combination of a cooking vessel having an elongated channel, pump means for maintaining a unidirectional flow of cooking oil along said channel at a constant volumetric rate, heating means in said channel, means for forming and dropping blanks of dough into the cooking oil at one end of said channel, means for removing cooked doughnuts from the other end of said channel, and rotatable blank inverting means at the mid-point of said channel adapted to invert the partly cooked blanks; said channel at the discharge side of said inverting means being restricted in cross sectional area with resultant localized increase in the linear rate of flow of said oil at said discharge side.

5. In a doughnut machine, the combination of a cooking vessel having an elongated channel, pump means for maintaining a unidirectional flow of cooking oil along said channel at a constant volumetric rate, heating means in said channel, means for forming and dropping blanks of dough into the cooking oil at one end of said channel, means for removing cooked doughnuts from the other end of said channel, and rotatable blank inverting means at the mid-point of said channel adapted to invert the partly cooked blanks; said channel at the point at which said blanks are dropped and at the discharge side of said inverting means being restricted in cross sectional area with incident localized increases in the linear rate of flow of said cooking oil at said restricted area points.

6. In a doughnut machine, the combination of a cooking vessel having an elongated channel, pump means for maintaining a unidirectional flow of cooking oil along said channel, heating means in said channel, means for forming and dropping blanks of dough into the cooking oil at one end of said channel, means for removing cooked doughnuts from the other end of said channel, and rotatable turning means at the mid-point of said channel adapted to invert the partly cooked blanks; said turning means including a constantly rotating shaft, a two bladed turner having a hub portion surrounding said shaft and rotatable about an axis laterally offset from the axis of said shaft, and clutch means carried by said hub portion and said shaft constructed and arranged to impart a half revolution to said turner for each full revolution of said shaft.

7. In a doughnut machine, the combination of a cooking vessel having an elongated channel, pump means for maintaining a unidirectional flow of cooking oil along said channel, heating means in said channel, means for forming and dropping blanks of dough into the cooking oil at one end of the channel, means for removing cooked doughnuts from the other end of said channel, and rotatable turning means at the mid-point of said channel adapted to invert the partly cooked blanks; said turning means including a constantly rotating driving shaft a two bladed turner having a hub portion surrounding said shaft and rotatable about an axis laterally offset from the axis of said shaft, and clutch means carried by said turner and said shaft comprising a dog element on said shaft and a pair of pin elements carried by said hub portion effective at each revolution of said shaft to rotate the turner through a half revolution only at the same speed as said shaft.

8. In a doughnut machine, the combination of a cooking vessel having an elongated channel, pump means for maintaining a unidirectional flow of cooking oil along said channel, heating means in said channel, means for forming and dropping blanks of dough into the cooking oil at one end of said channel, means for removing cooked doughnuts from the other end of said channel, and rotatable turning means at the mid-point of said channel adapted to invert the partly cooked blanks; said turning means including a constantly rotating shaft a two bladed turner having a hub portion surrounding said shaft and rotatable about an axis laterally offset from the axis of said shaft, and clutch means carried by said turner and said shaft comprising a dog element fixed to said shaft and a pair of diametrically opposite, spring biased pin elements carried by said hub portion and adapted to be engaged in alternation by said dog element operative to impart successive half revolutions to said turner during alternative half revolutions of said shaft; said spring biased pin elements, additionally, being effective to permit said turner to be rotated independently of said shaft.

9. In a doughnut forming and cooking machine, the combination with a heated cooking vessel having an elongated channel along which doughnuts are propelled in cooking oil contained in said channel while being cooked of doughnut forming means comprising, an enclosed dough container suspended above one end of said channel, doughnut blank forming die mechanism at the lower end of said container, a motor, a constant speed shaft operatively connected to said motor and mechanism interposed between said shaft and said die mechanism effective to periodically open and close said die mechanism at manually selective, different frequencies.

10. In a doughnut forming and cooking machine, the combination with a heated cooking vessel having an elongated channel along which doughnuts are propelled in cooking oil contained in said channel while being cooked of doughnut forming means comprising, a vertical axis motor, a worm gear operated thereby, a cam roller actuated by said worm gear, a lever intermittently engaged by said roller, a vertically reciprocable, spring biased rod connected at one end to said lever and at its other end to said die mechanism; the engagement between said cam roller and said lever being adapted to effect the opening of said die and to permit said spring bias on said rod to effect the closure thereof; a second cam operated by said worm gear at a different rate of rotation than that of said worm gear, and devices operated by said second cam constructed and arranged to open and close said die at a different frequency than that effected by said first-named cam and manually operable means for selectively rendering said first cam or said second cam effective to operate said die.

11. In a doughnut forming and cooking machine, the combination with a heated cooking vessel having an elongated channel along which doughnuts are propelled in cooking oil contained in said channel while being cooked of doughnut forming means comprising, a vertical axis motor, a worm gear operated thereby, a cam roller actuated by said worm gear, a lever intermittently engaged by said roller, a vertically reciprocable, spring biased rod connected at one end to said lever and at its other end to said die mechanism; the engagement between said cam roller and said lever being adapted to effect the opening of said die and to permit said spring bias on said rod to effect the closure thereof, a second cam operatively connected to said worm gear for rotation thereby at a different rate than said cam roller, a solenoid coil adapted to be electrically connected to and disconnected from a source of energy, a reciprocable armature in said coil adapted to be moved axially thereof upon energization of said coil; said armature being connected to said rod for opening said die mechanism a normally open switch interposed between said coil and the source of electrical energy including an element positioned for intermittent engagement by said second cam and resultant closing of said switch during such engagement and a manually operable switch interposed between said coil and the source of energy operable to render said solenoid operative or inoperative at the will of the operator.

FREDERICK W. CORBETT.

REFERENCES CITED

The following references are of record in the file of this patent:

UNITED STATES PATENTS

| Number | Name | Date |
|---|---|---|
| 1,044,308 | Wagner | Nov. 12, 1912 |
| 1,516,962 | Gunsolley | Nov. 25, 1924 |
| 1,569,383 | Lindsey | Jan. 12, 1926 |
| 1,688,315 | Denz et al. | Oct. 16, 1928 |
| 1,825,844 | Ainslie | Oct. 6, 1931 |
| 1,854,148 | Hunter | Apr. 12, 1932 |
| 1,855,922 | Mosher | Apr. 26, 1932 |
| 1,866,332 | Toews | July 5, 1932 |
| 2,057,639 | Bergner | Oct. 13, 1936 |
| 2,208,877 | Caswell et al. | July 23, 1940 |